(12) United States Patent
Haase

(10) Patent No.: US 7,758,126 B2
(45) Date of Patent: Jul. 20, 2010

(54) FOLDING HEADREST

(75) Inventor: Charles Haase, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 12/061,151

(22) Filed: Apr. 2, 2008

(65) Prior Publication Data

US 2009/0179475 A1 Jul. 16, 2009

Related U.S. Application Data

(60) Provisional application No. 61/020,184, filed on Jan. 10, 2008.

(51) Int. Cl.
*B60N 2/48* (2006.01)
*B60N 2/30* (2006.01)
*B60N 2/36* (2006.01)

(52) U.S. Cl. .............. 297/408; 297/378.12; 297/378.14

(58) Field of Classification Search ................. 297/408, 297/378.12, 378.14
See application file for complete search history.

(56) References Cited

U.S. PATENT DOCUMENTS

| | | | |
|---|---|---|---|
| 4,304,439 A * | 12/1981 | Terada et al. ............. 297/408 X |
| 4,351,563 A * | 9/1982 | Hattori ........................ 297/408 |
| 4,600,240 A * | 7/1986 | Suman et al. ................ 297/408 |
| 4,674,792 A * | 6/1987 | Tamura et al. .............. 297/408 |
| 4,674,797 A * | 6/1987 | Tateyama .................... 297/408 |
| 4,678,232 A * | 7/1987 | Ishida et al. ................. 297/408 |
| 4,798,415 A * | 1/1989 | Tanino et al. ........... 297/408 X |
| 5,590,933 A | 1/1997 | Andersson |
| 5,669,668 A | 9/1997 | Leuchtmann |
| 5,681,079 A * | 10/1997 | Robinson ............ 297/378.12 X |
| 5,738,411 A * | 4/1998 | Sutton et al. ........... 297/378.12 |
| 5,738,412 A * | 4/1998 | Aufrere et al. .............. 297/408 |
| 5,826,942 A * | 10/1998 | Sutton et al. ........... 297/378.12 |
| 5,992,937 A | 11/1999 | Pilhall |
| 6,045,181 A * | 4/2000 | Ikeda et al. ............. 297/216.12 |
| 6,074,010 A * | 6/2000 | Takeda .................... 297/408 X |
| 6,074,011 A | 6/2000 | Ptak et al. |
| 6,129,421 A * | 10/2000 | Gilson et al. ................. 297/408 |
| 6,302,485 B1 * | 10/2001 | Nakane et al. .............. 297/408 |
| 6,612,653 B2 * | 9/2003 | Takata ......................... 297/408 |
| 6,672,665 B1 | 1/2004 | Tseng |
| 6,702,385 B2 | 3/2004 | Holdampf et al. |
| 6,880,890 B1 | 4/2005 | DeBrabant |
| 6,910,740 B2 | 6/2005 | Baker et al. |
| 6,935,696 B2 * | 8/2005 | Gauthier et al. ............. 297/408 |
| 7,044,555 B2 * | 5/2006 | Saberan ...................... 297/408 |
| 7,070,240 B2 | 7/2006 | Schmitt et al. |
| 7,100,988 B1 | 9/2006 | Hyslop |
| 7,258,400 B2 * | 8/2007 | Yamada ................. 297/378.12 |
| 7,325,877 B2 * | 2/2008 | Brockman et al. .......... 297/408 |
| 7,341,312 B2 * | 3/2008 | Gauthier et al. ............. 297/408 |
| 7,422,280 B2 * | 9/2008 | Brockman .............. 297/408 X |

(Continued)

*Primary Examiner*—Rodney B White
(74) *Attorney, Agent, or Firm*—Mark E. Duell, Esq.; Emerson, Thomson Bennett

(57) ABSTRACT

A headrest assembly may include a first frame member operatively connected to a seat, a second frame member that is selectively movable with respect to the first frame member, and a locking mechanism for use in adjusting the first locking member between a first locked condition that prevents the second frame member from moving relative to the first frame member and a second adjustable condition that permits the second frame member to move relative to the first frame member.

20 Claims, 13 Drawing Sheets

U.S. PATENT DOCUMENTS

| | | | |
|---|---|---|---|
| 7,543,891 B2 * | 6/2009 | Chung | 297/408 |
| 7,669,932 B1 * | 3/2010 | Gronninger et al. | 297/408 |
| 2005/0029853 A1 * | 2/2005 | Gauthier et al. | 297/408 |
| 2006/0226690 A1 | 10/2006 | Neale | |
| 2007/0152487 A1 * | 7/2007 | Brockman et al. | 297/408 |
| 2007/0236070 A1 * | 10/2007 | Brockman | 297/408 |

* cited by examiner

FOLDING HEADREST

This application claims priority to U.S. Ser. No. 61/020,184, entitled FOLDING HEADREST, filed Jan. 10, 2008, which is incorporated herein by reference.

I. BACKGROUND OF THE INVENTION

A. Field of Invention

This invention pertains generally to the art of methods and apparatuses regarding vehicle occupant head support and more specifically to methods and apparatuses regarding vehicle headrest assemblies.

B. Description of the Related Art

It is well known in the art of automotive vehicles to provide seat assemblies for supporting occupants in a seated position within the vehicle. Generally, each seat assembly includes a seat cushion and a seat back. The seat back supports the back of an occupant who is seated on the seat cushion. It is also known in the art to provide seatbacks that can be folded or position adjusted in some manner from the use position (where the seatback is roughly perpendicular to the seat cushion) to a relatively downward and/or storage position.

Often known seat assemblies include a headrest assembly that is typically mounted on the seat back for supporting the head of the occupant. Usually the headrest assembly extends above the top of the seat back and is operable to receive an occupant's head both during normal driving conditions, especially during acceleration, as well as during unusual and extreme conditions such as during a collision. It is known to provide headrest assemblies that can be position adjusted in order to adapt to occupants of various heights. Some headrest assemblies can be adjusted both in the up-and-down direction and in the fore and aft direction. A growing number of countries are requiring vehicle manufacturers to produce seats with increased seat and back heights for increased protection for an occupant during a collision.

However, increasing the height of seatbacks in rear seat assemblies results in reduced or otherwise obstructed rearward visibility for front seat occupants, especially for the driver. In addition, the headrest assembly may have to be removed before the seat back can be position adjusted. Therefore, it is desirable to have a headrest assembly that can be adjustable between an upright use position and a downward and/or "out-of-the-way" position to improve rearward visibility for the driver when the seats are not in use. It is also desirable to have a headrest assembly that can be position adjusted to reduce the amount of space required when a seat back is folded down.

Although many known methods work well for their intended purpose, several disadvantages exist. One known disadvantage is the requirement for a complicated lock mechanism for maintaining the headrest in the upright position. Another known disadvantage is the requirement for an increase in thickness of the folding headrest due to the lock mechanism.

II. SUMMARY OF THE INVENTION

According to one embodiment of the invention, a headrest assembly may comprise: (A) a first frame member operatively connectable to an associated seat, wherein the first frame member comprises a slot having a first portion with a first width and a second portion with a second width that is substantially larger than the first width; (B) a second frame member that is selectively movable with respect to the first frame member; and, (C) a locking mechanism comprising: (1) a first locking member having a first portion with a first width and a second portion with a second width that is substantially larger than the first width; (2) wherein the first width of the first portion of the first locking member is less than or equal to the first width of the first portion of the slot and the second width of the second portion of the first locking member is greater than the first width of the first portion of the slot; and, (3) a second locking member operatively attached to the first locking member for use in adjusting the first locking member between a first locked condition, where the second portion of the first locking member is received within the second portion of the slot, that prevents the second frame member from moving relative to the first frame member, and a second adjustable condition, where the first portion of the first locking member is received within either the first or the second portions of the slot, that permits the second frame member to move relative to the first frame member.

According to another embodiment of this invention, a method may comprise the steps of: (A) providing a seat; (B) providing a headrest assembly comprising: (1) a first frame comprising a slot having a first portion with a first width and a second portion with a second width that is substantially larger than the first width; (2) a second frame member that is selectively movable with respect to the first frame member; and, (3) a locking mechanism comprising: a first locking member having a first portion with a first width and a second portion with a second width that is substantially larger than the first width; wherein the first width of the first portion of the first locking member is less than or equal to the first width of the first portion of the slot and the second width of the second portion of the first locking member is greater than the first width of the first portion of the slot; and, a second locking member operatively attached to the first locking member; and, (C) placing the headrest assembly into a locked condition that prevents the second frame member from moving relative to the first frame member by positioning the second portion of the first locking member within the second portion of the slot; (D) adjusting the headrest assembly into a adjustable condition that permits the second frame member to move relative to the first frame member by positioning the first portion of the first locking member within the second portion of the slot; and, (E) adjusting the headrest assembly by pivoting the first frame member with respect to the second frame member as the first portion of the first locking member moves from the second portion of the slot into the first portion of the slot.

One advantage of this invention according to one embodiment is that the thickness of the folding headrest is reduced due to the improved locking mechanism while the headrest may still be rotated through at least eighty degrees.

Another advantage of this invention is that the number of parts required to assemble the folding headrest is reduced.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
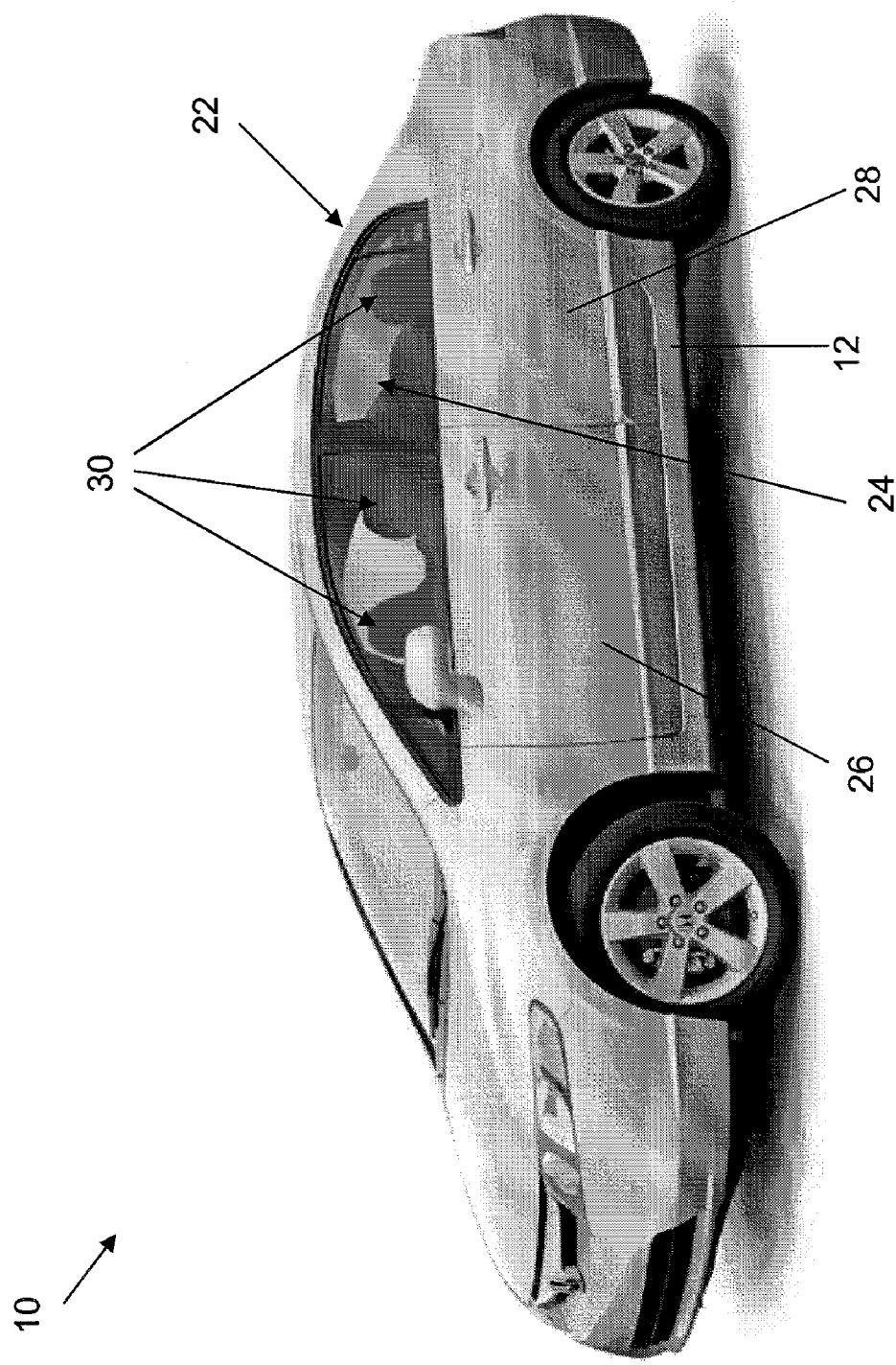
FIG. 1 is a side perspective view of a vehicle equipped with a headrest according to one embodiment of this invention.
Figure 2:
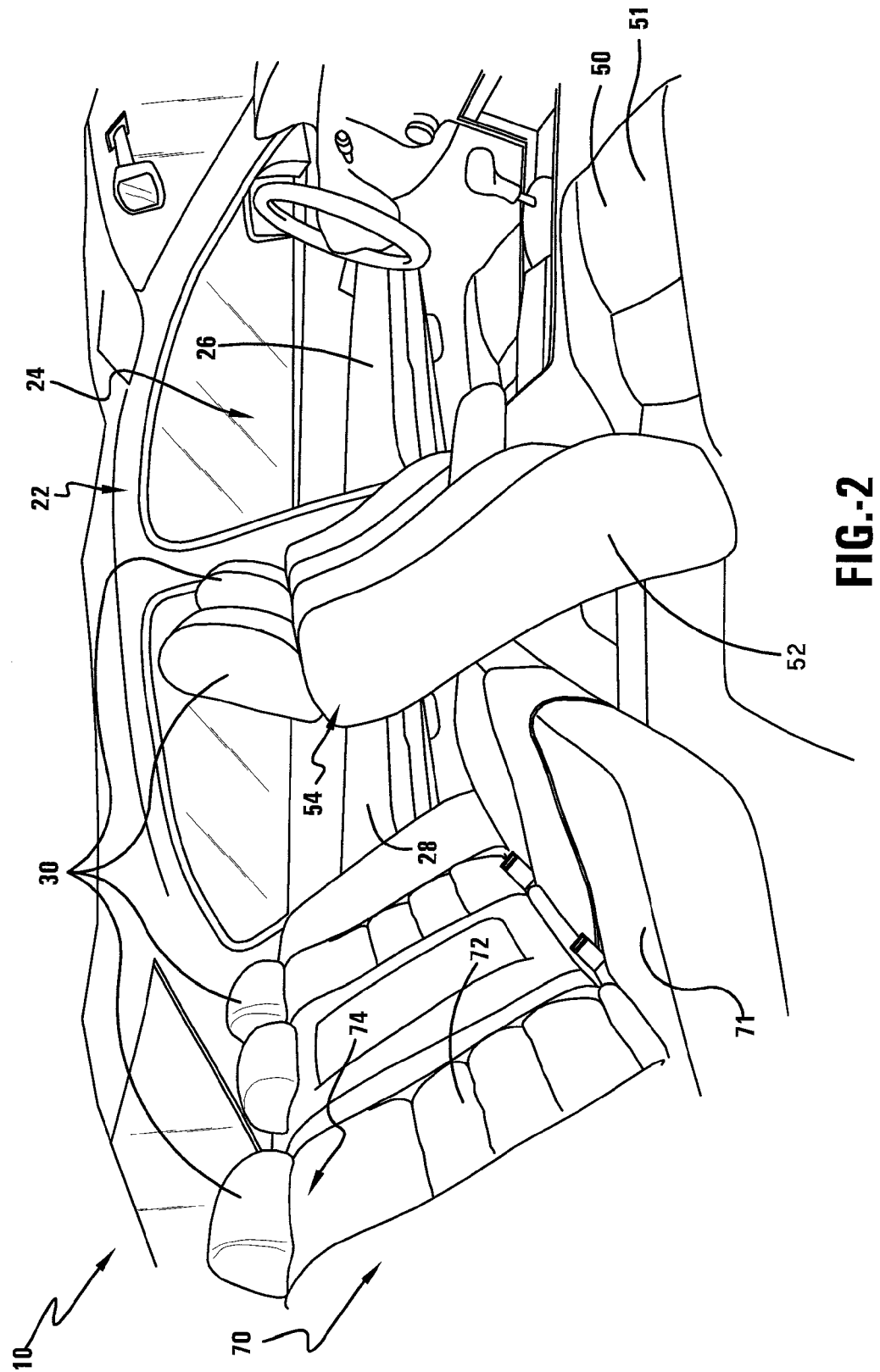
FIG. 2 is a side perspective view of a vehicle interior showing a headrest according to one embodiment of this invention.
Figure 3:
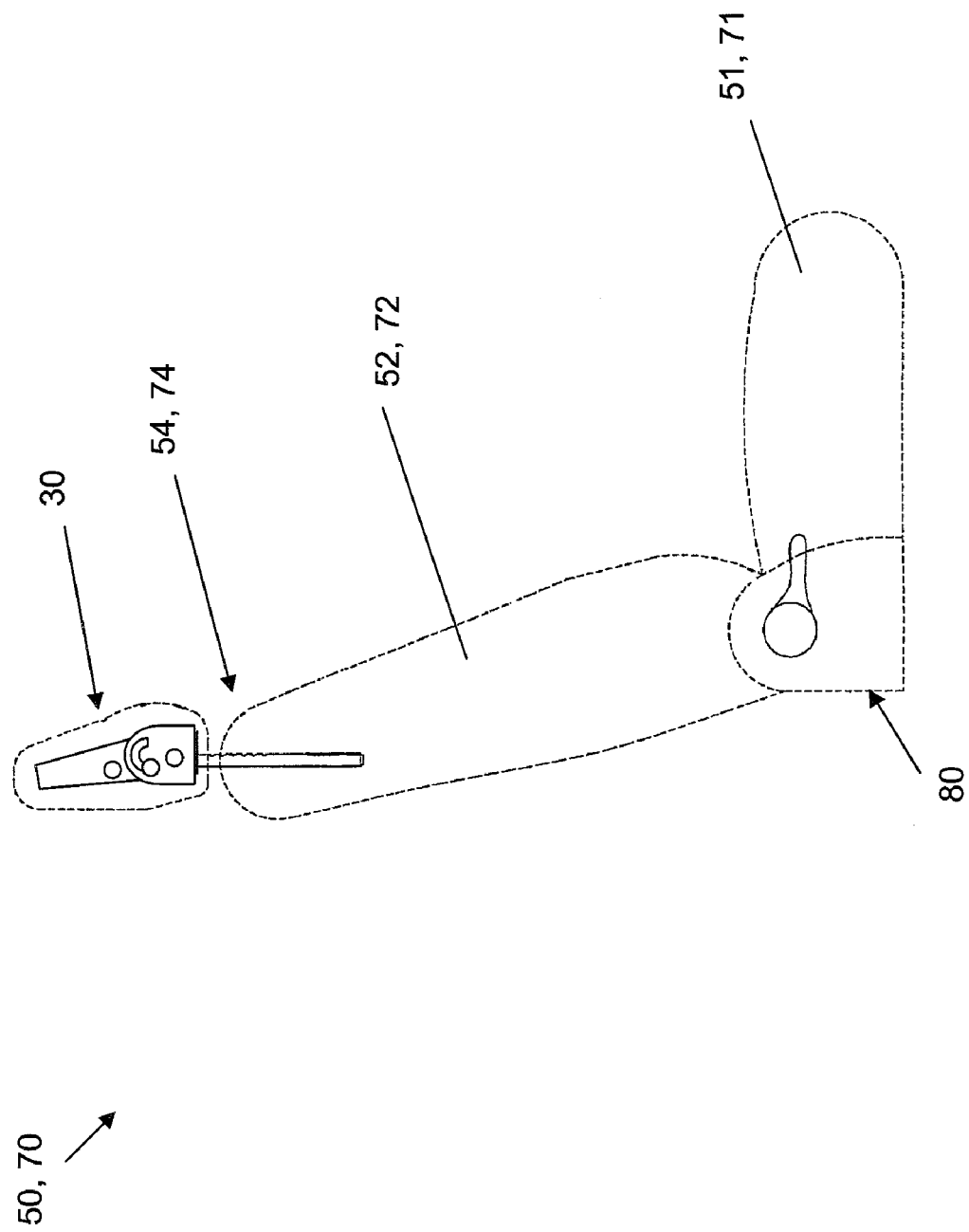
FIG. 3 is a side perspective view of a vehicle seat showing a headrest in an upright position according to one embodiment of this invention.
Figure 13:
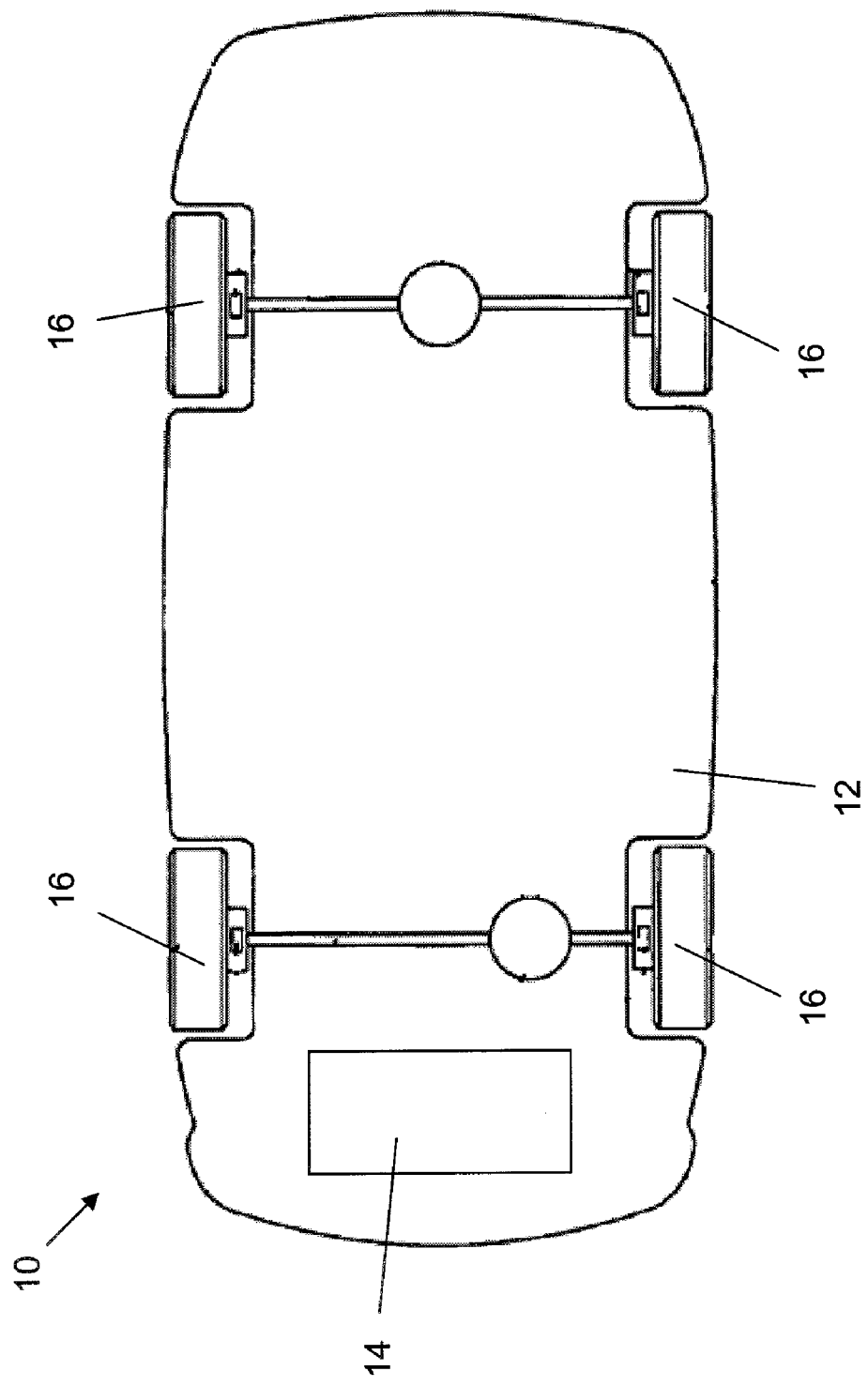
FIG. 13 shows a schematic bottom view of a vehicle.

Referring now to the drawings wherein the showings are for purposes of illustrating embodiments of the invention only and not for purposes of limiting the same, FIG. 1 shows an exterior view of a vehicle 10 equipped with a headrest assembly 30 according to one embodiment of this invention and FIG. 2 shows an interior view of the vehicle 10. As shown in FIGS. 1 and 13, the vehicle 10, as is well known in the art, may include a frame 12, a drive train including an engine 14 mounted to the frame 12, and one or more ground engaging wheels 16 which are operatively attached to the frame 12 and are used to provide locomotion for the vehicle 10. It should be understood that while the vehicles shown are passenger cars, this invention will work well with any vehicle including, but not limited to, cars, trucks, sport utility vehicles, cross-over vehicles, motorcycles, off-road vehicles, all-terrain vehicles, and airplanes as well as other passenger carrying devices such as boats. This invention may also work well in non-vehicle applications.

Figure 4:
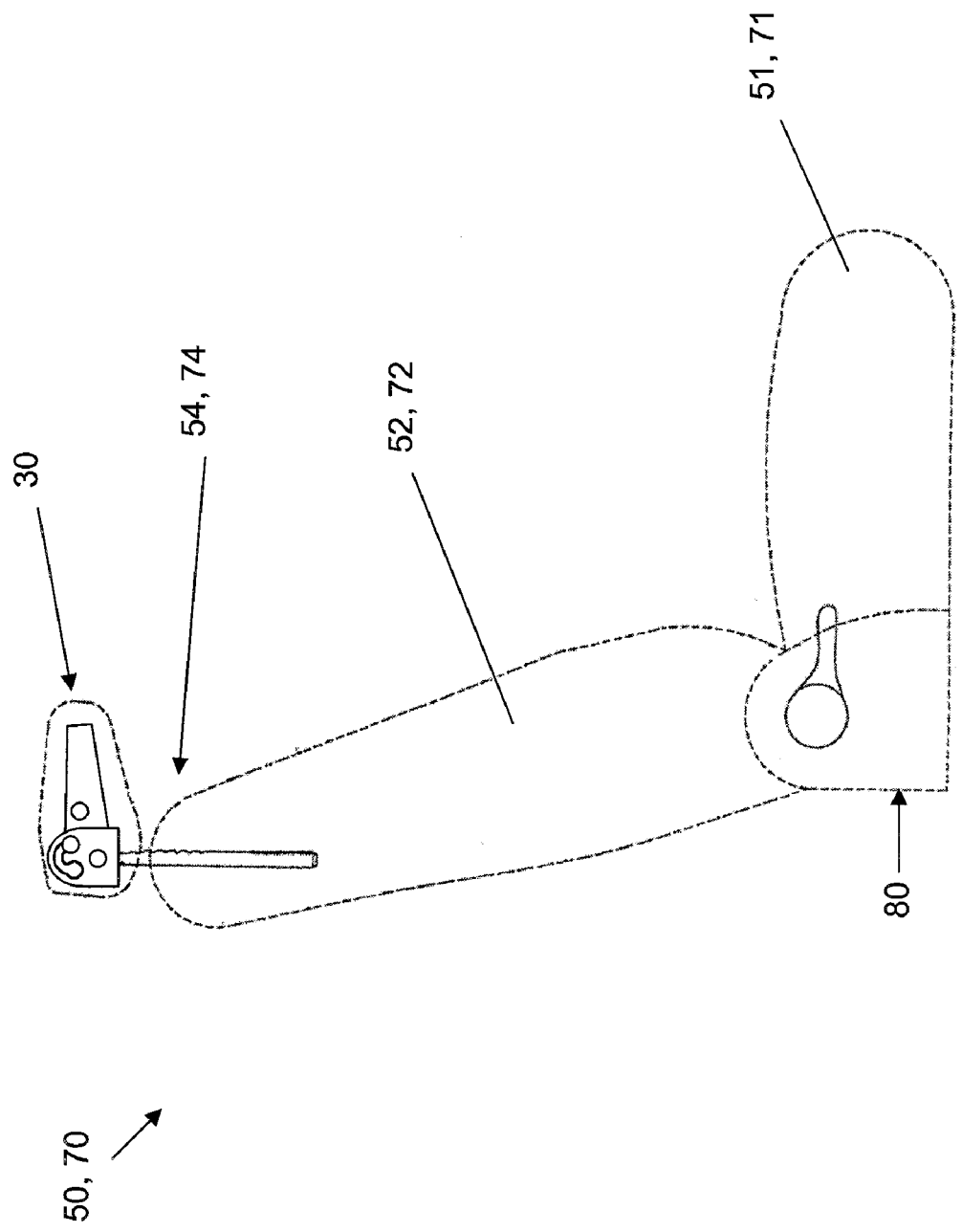
FIG. 4 is a side perspective view of a vehicle seat showing a headrest in a downward position according to one embodiment of this invention.
Figure 5:
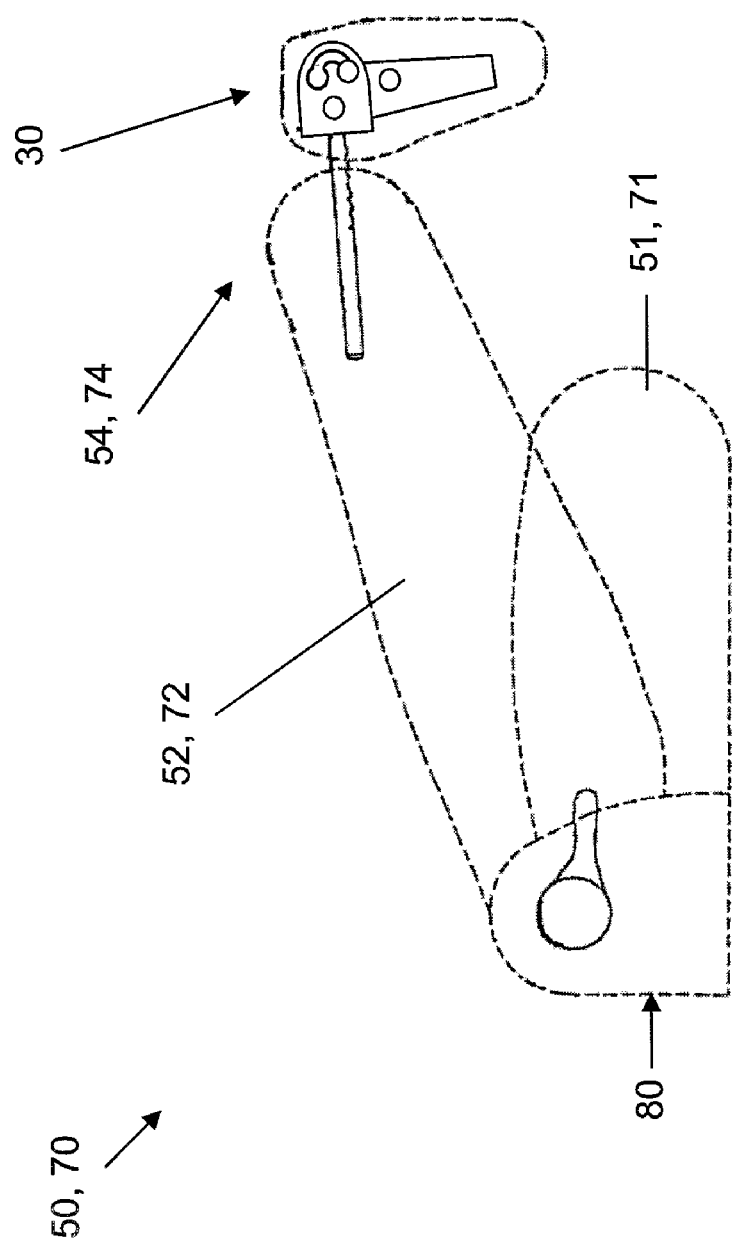
FIG. 5 is a side perspective view of a vehicle seat showing both a seatback and a headrest in a downward position according to another embodiment of this invention.
Figure 6:
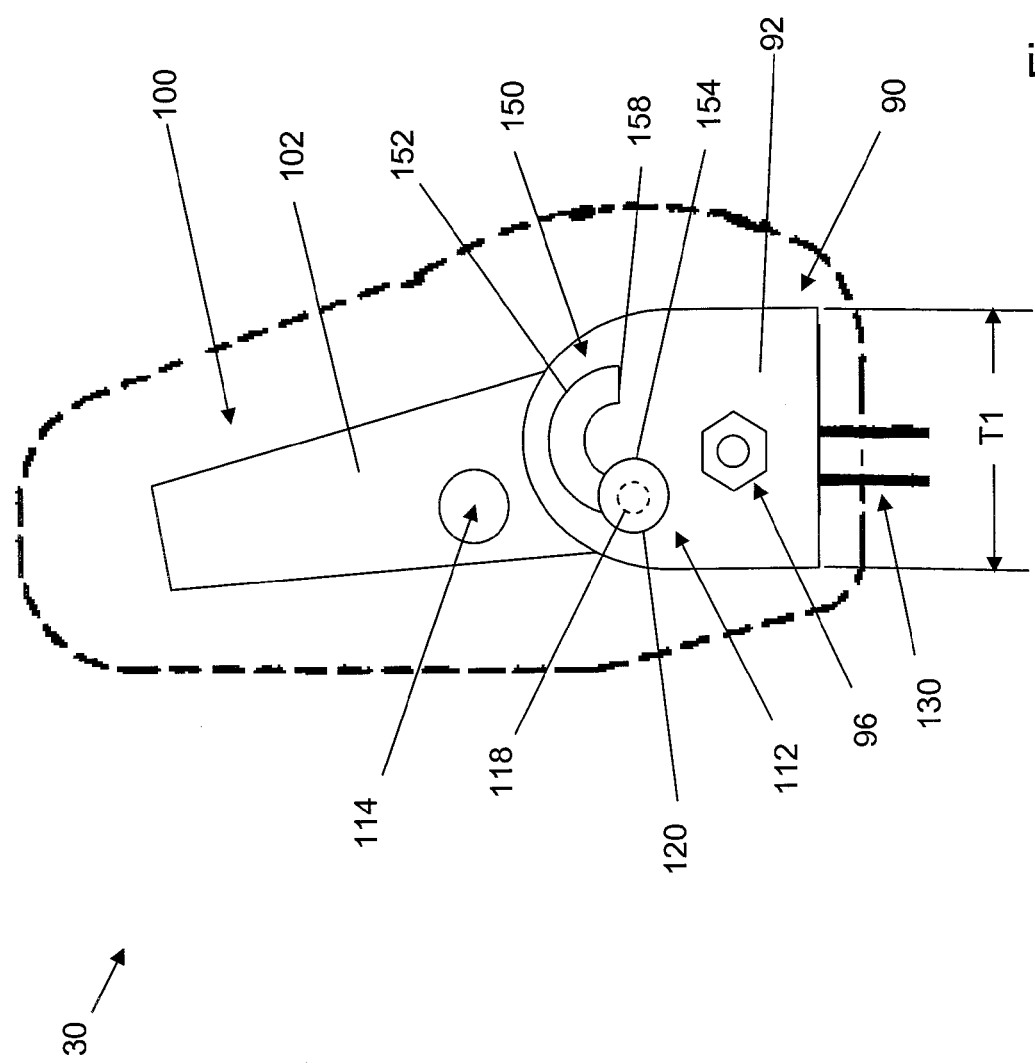
FIG. 6 is a side view of a headrest assembly in an upright position according to one embodiment of this invention.
Figure 7:
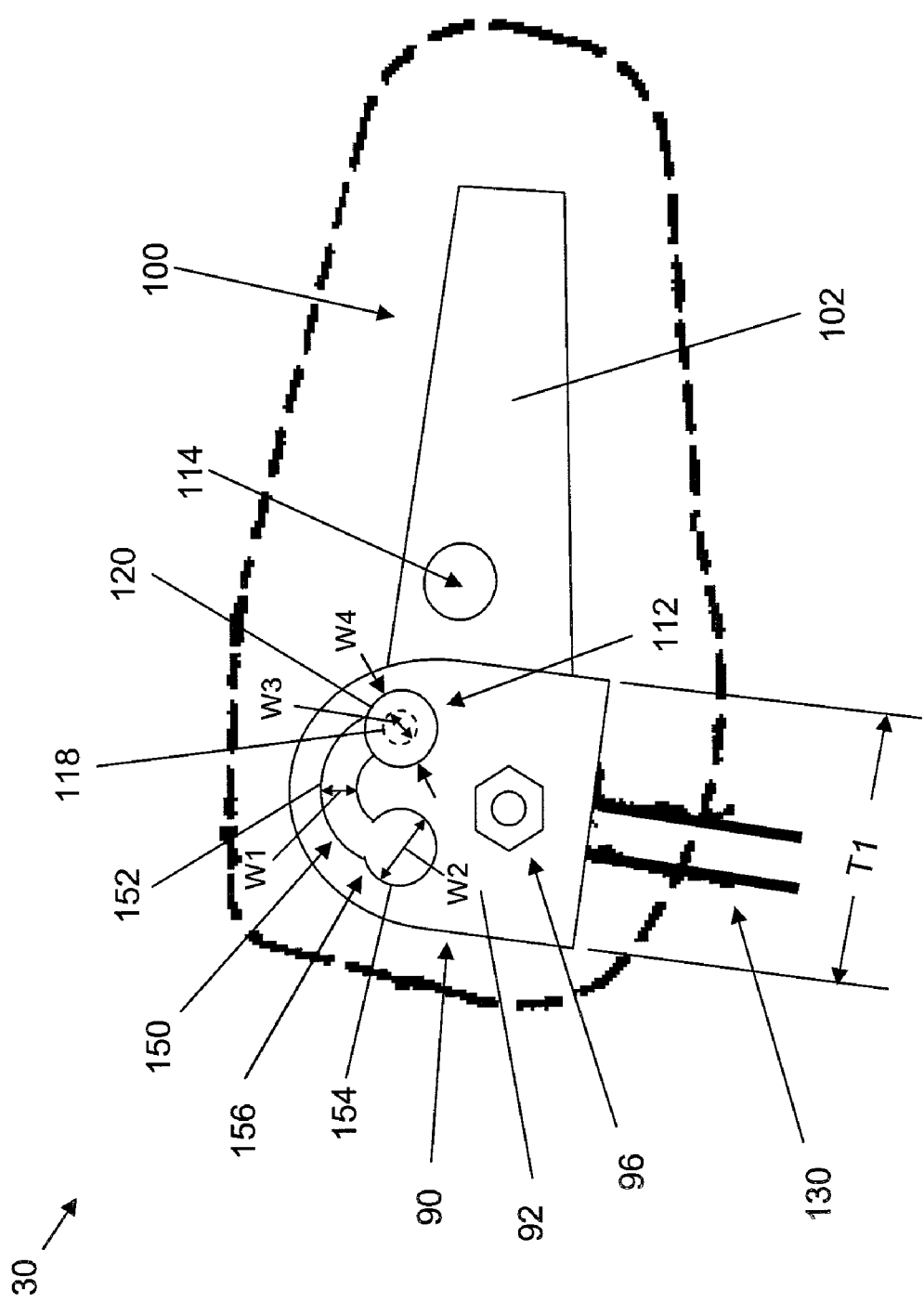
FIG. 7 is a side view of a headrest assembly in a downward position according to another embodiment of this invention.
Figure 8:
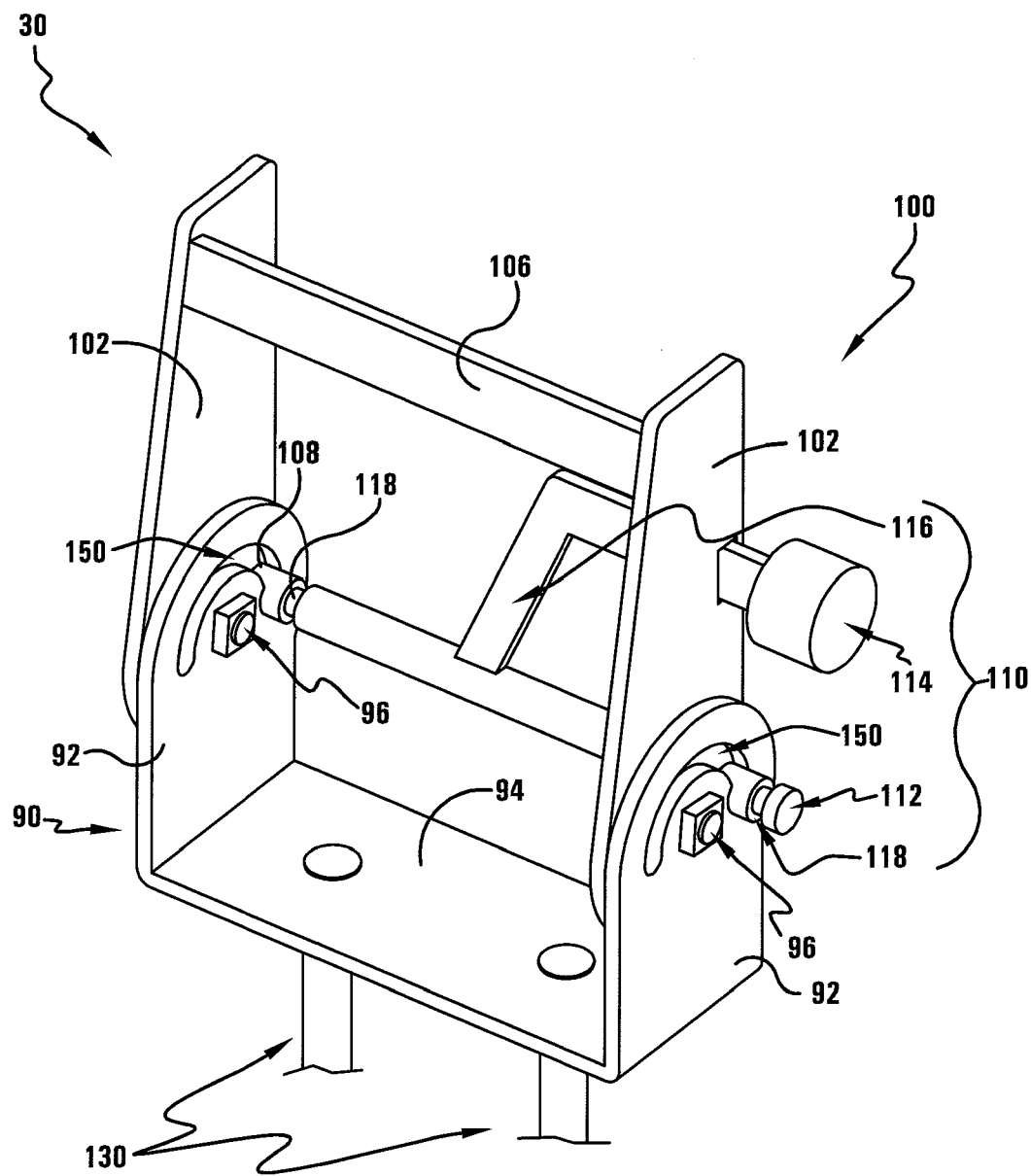
FIG. 8 is a front perspective see-through view of a headrest in a locked condition according to one embodiment of this invention.
Figure 9:
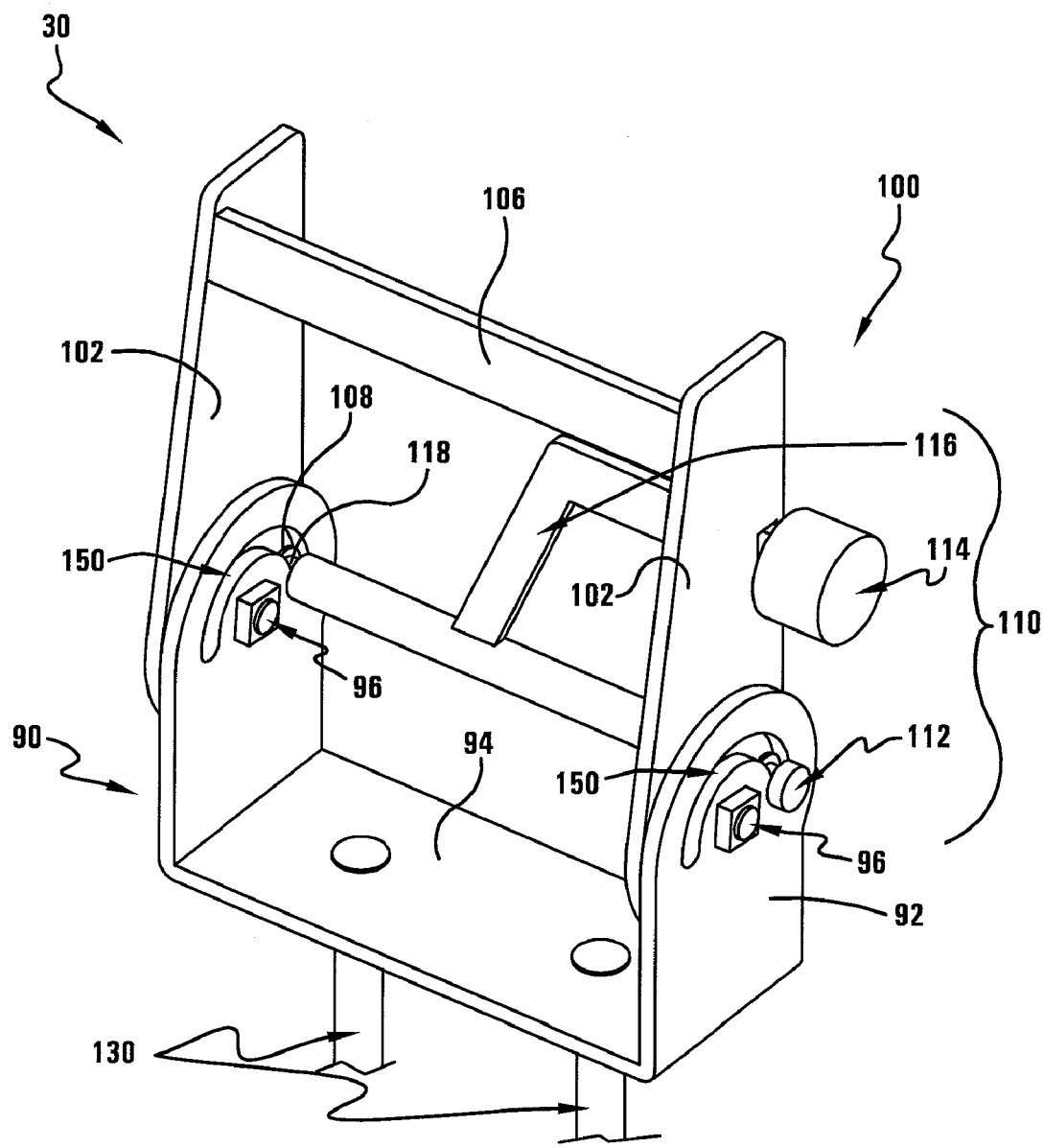
FIG. 9 is a view similar to that shown in FIG. 8 but showing the head rests being adjusted according to one embodiment of this invention.
Figure 10:
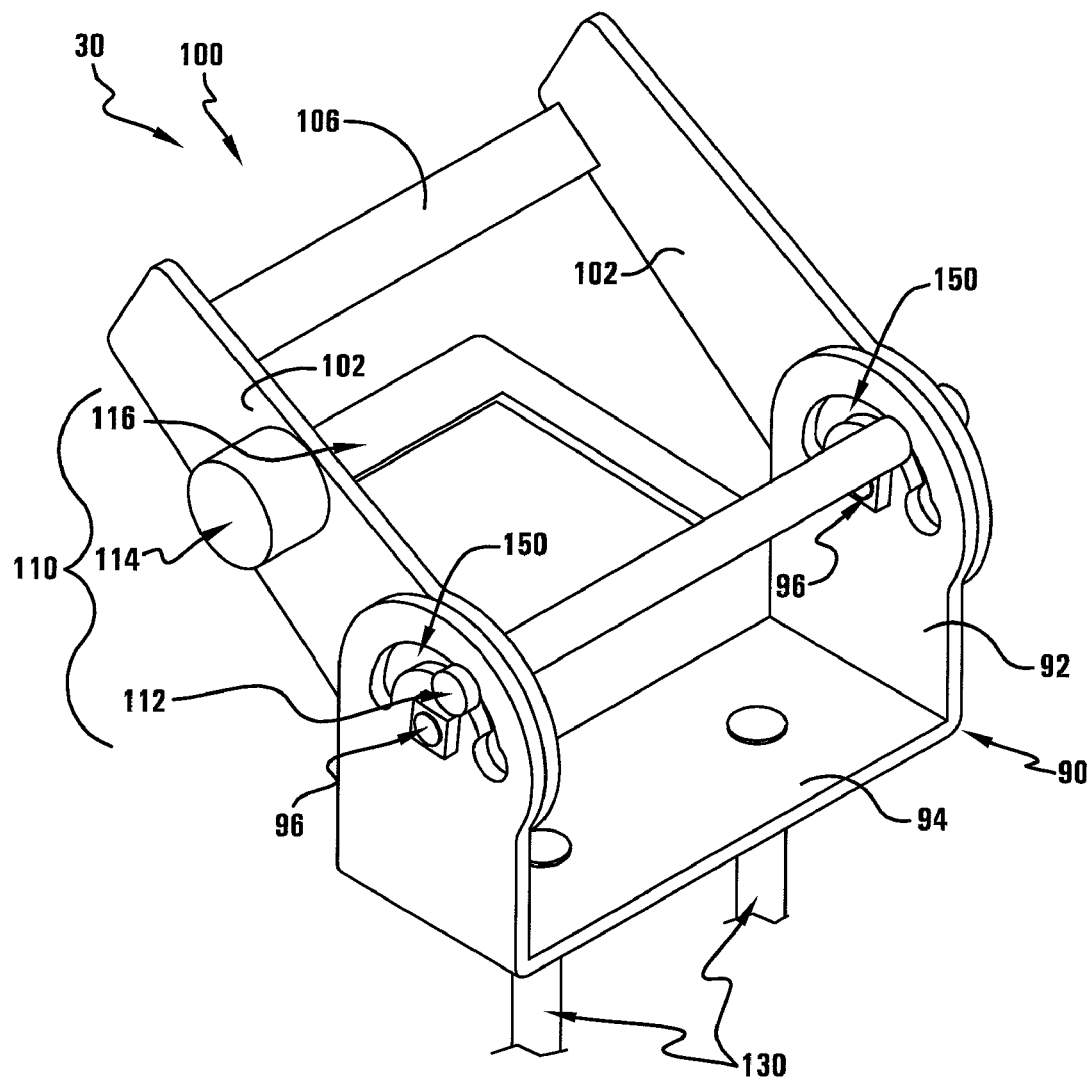
FIG. 10 is a rear perspective see-through view of a headrest according to one embodiment of this invention.
Figure 11:
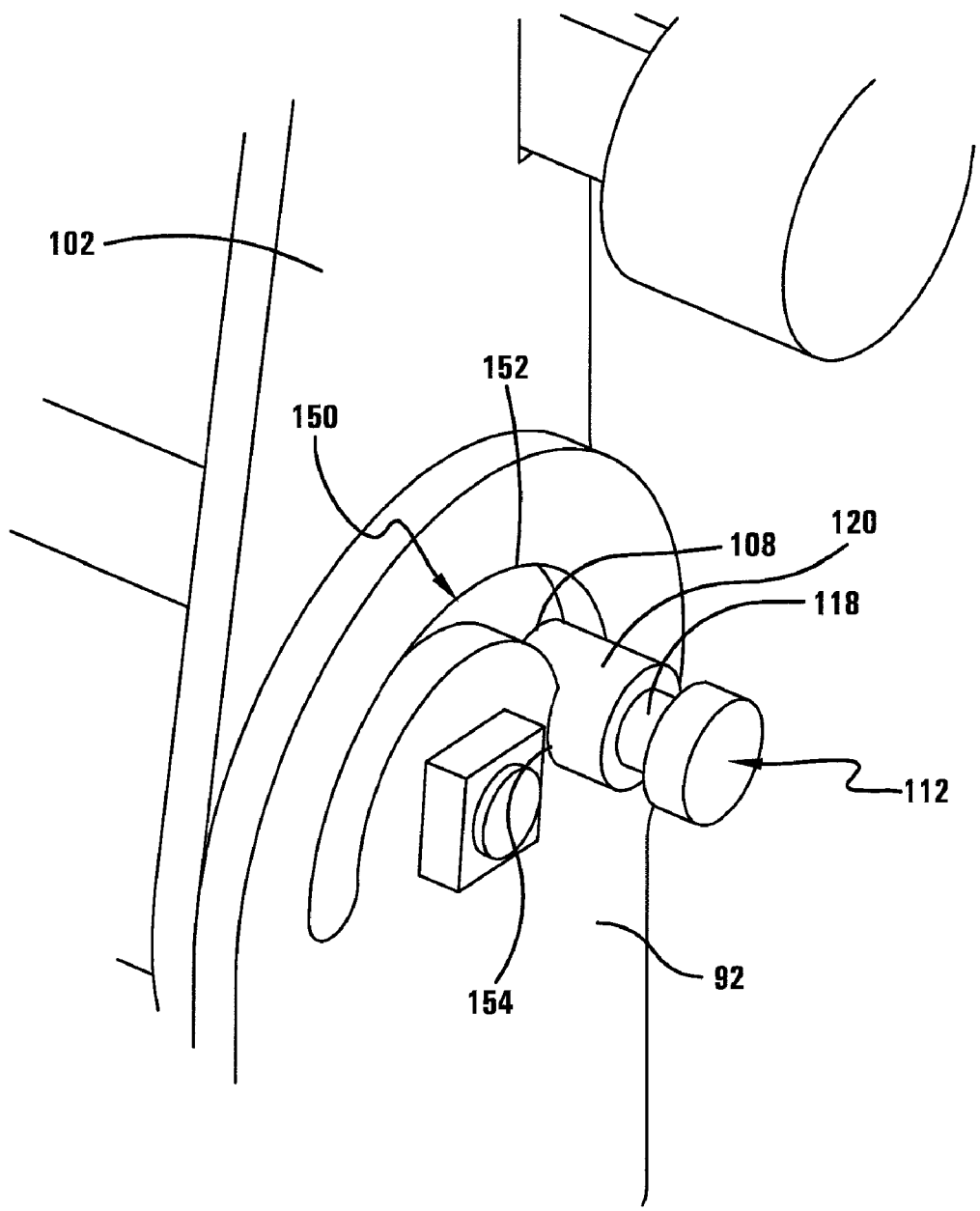
FIG. 11 is a close-up perspective view of the locking mechanism in the showing the locked condition according to one embodiment of this invention.
Figure 12:
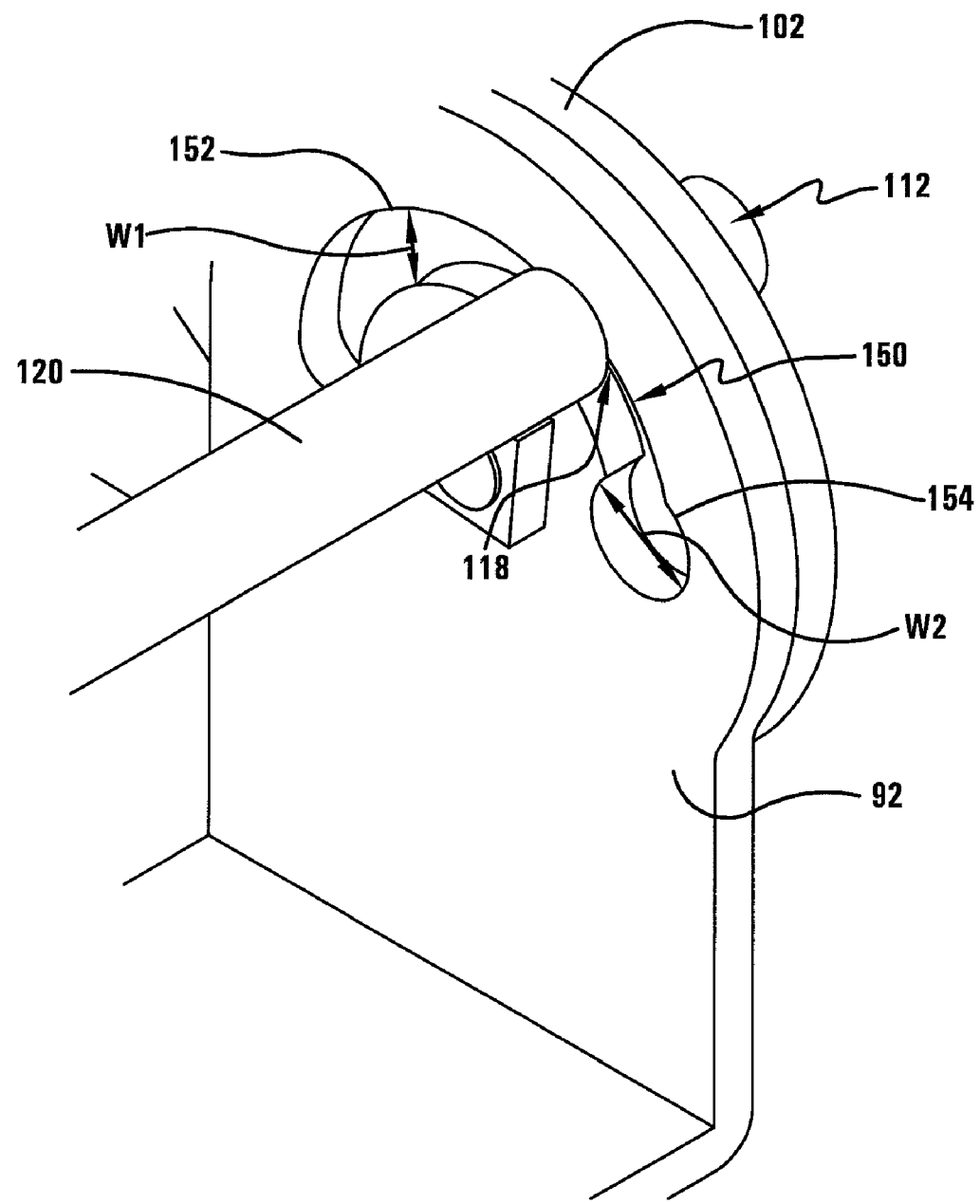
FIG. 12 is a close-up perspective view of the locking mechanism in the adjustable condition according to one embodiment of this invention.

With reference now to FIGS. 1-2, the vehicle 10 may also include a body 22 defining a passenger compartment 24. One or more doors 26, 28 may provide entry into the passenger compartment 24 in any manner known in the art. One or more front seats 50 and/or one or more rear seats 70 may be positioned within the passenger compartment 24 and mounted to the vehicle 10. Each seat 50, 70 may comprise a seat cushion 51, 71 and a seatback 52, 72 for use as is well known in the art. In one embodiment, a seat adjustment mechanism 80 may be used to position adjust the seat back 52, 72 from a roughly perpendicular use position (shown in FIG. 4) to a relatively downward and/or folded condition (shown in FIG. 5). It should be noted, however, that the headrest assembly 30 of this invention will work well even when the seatback 52, 72 cannot be position adjusted. Any number of headrest assemblies 30 may be used on one or more seats 50, 70 in accordance with this invention. In one embodiment, the headrest assembly 30 may extend from a top portion 54, 74 of the seatback 52, 72. However, it is to be understood that in other embodiments the headrest assembly 30 may extend from any other portion of the seat 50, 70 or any non-seat surface selected with the sound judgment of a person of ordinary skill in the art.

With reference now to FIGS. 3-12, in one embodiment the headrest assembly 30 may include a first frame member 90, a second frame member 100, and a locking mechanism 110. In one embodiment, the thickness T1 of the headrest assembly 30 is relatively narrow; such as 60 millimeters (mm) or less. In a more specific embodiment, the thickness T1 of the headrest assembly 30 is substantially less than 60 mm. The first frame member 90, the second frame member 100, and the locking mechanism 110 may be made from metal, plastic, or any other material chosen with the sound judgment of a person of ordinary skill in the art. The first frame member 90, in the illustrated embodiment, may have a general U-shape, as shown, with a pair of upright portions 92 and a substantially horizontal portion 94. In another embodiment, the first frame member 90 has a general L-shape with one upright portion 92 operatively connected to the substantially horizontal portion 94. In still another embodiment, the first frame member 90 is substantially one-piece. An attaching member 130 may operatively connect to the substantially horizontal portion 94 of the first frame member 90 by rivets, screws, welding, or any other means or method chosen within sound engineering judgment. The attaching member 130 may then operatively connect to the top portion 54, 74 of a seatback 52, 72 by the any attaching means chosen within sound judgment of a person of ordinary skill in the art. In a specific embodiment, the attaching member 130 includes two substantially parallel metal posts that are received into the top portion 54, 74 of the seatback 52, 72. In one embodiment, the position of the first frame member 90 can be adjustable with respect to the seatback 52, 72 by the attaching member 130.

With continuing reference to FIGS. 3-12, the first frame member 90 may include a slot 150 in an upright portion 92. In another embodiment, a slot 150 is located in each of the upright portions 92. The slot 150 may have any shape chosen with the sound judgment of a person of ordinary skill in the art. In one specific embodiment, the slot 150 may be substantially arcuate, as shown. Each slot 150 may include a first portion 152 having a first width W1 and a second portion 154 having a second width W2. In one embodiment, the second width W2 is substantially larger than the first width W1, as shown. The first portion 152 may comprise the majority of the length of the slot 150, as shown. In one embodiment, the first portion 152 includes substantially the entire slot 150, except for the second portion 154. The second portion 154 may be located at one end 156 of the slot 150. In another embodiment, the second portion 154 may be located at one end 156 of the slot 150 while a third portion, not shown but similar to the second portion 154, may be located at the opposite end 158 of the slot 150. In still another embodiment, the second portion 154 is located between the ends 156, 158 of the slot 150. For the embodiment shown, the second portion 154 is substantially circular in shape having a diameter defining the second width W2. It should be noted, however, that the shape of the second portion 154 can be any chosen with the sound judgment of a person of ordinary skill in the art.

With continuing reference to FIGS. 3-12, the second frame member 100 may include two substantially parallel side members 102 and a cross member 106. In one embodiment, the second frame member 100 may be a substantially inverted U-shape. In anther embodiment, the second frame member 100 is substantially one-piece. The side member 102, or in another embodiment each side member 102, 102, may include an opening 108 sized to receive a first locking member 112 as will be described further below. The second frame member 100 may be operatively connected to the first frame member 90. Any more specific embodiment, the second frame member 100 may be selectively movable with respect to the first frame member 90. In yet a more specific embodiment, the second frame member 100 may be pivotally connected to the first frame member 90 at a pivot location 96 by rivets, bolts, screws, or by any other means chosen with the sound judgment of a person of ordinary skill in the art.

Still referring to FIGS. 3-12, the locking mechanism 110 may include a first locking member 112 and a second locking member 114. The first locking member 112 may be position adjusted by the second locking member 114 between a locked condition with respect to the first frame member 90 (preventing motion of the headrest assembly 30 from the upright "use" position into the downward or "out-of-the-way" position) and an unlocked or adjustable condition with respect to the first frame member 90 (permitting motion of the headrest assembly 30 from the upright "use" position into the downward or "out-of-the-way" position). The first locking member 112 may include a first portion 118 having a first width W3 and a second portion 120 having a second width W4. In one embodiment, the second width W4 is substantially larger than the first width W3, as shown. For the embodiment shown, the second portion 120 is substantially circular in shape having a diameter defining the second width W4. It should be noted, however, that the shape of the second portion 120 can be any chosen with the sound judgment of a person of ordinary skill in the art. Similarly, for the embodiment shown, the first portion b is substantially circular in shape having a diameter defining the first width W3. It should be noted, however, that the shape of the first portion 118 can be any chosen with the sound judgment of a person of ordinary skill in the art. The first portion 152 of the slot 150 is sized to receive the first portion 118 of the first locking member 112 but not the second portion 120 of the first locking member 112. For this reason, the first width W3 of the first portion 118 is less than or equal to the first width W1 of the first portion 152 of the slot 150 and the second width W4 of the second portion 120 is greater than the first width W1 of the first portion 152. The second portion 154 of the slot 150 is sized to receive the second portion 120 of the first locking member 112. For this reason, the second with W4 of the second portion 120 is less than or equal to the second width W2 of the second portion 154 of the slot 150. To further accomplish the receiving of the first locking member 112 into the slot 150 as just described, it should be noted that the first portion 118 of the first locking member 112 has a thickness (along the length of the first locking member 112) equal to or greater than the thickness of the frame member 90 where the slot 150 is defined. The first locking member 112 may be received with the opening(s) 108 of the side member 102.

With continuing reference to FIGS. 3-12, the second locking member 114, as noted above, is used to move the first locking member 112 between the first locked condition and the second adjustable condition. In one embodiment, the second locking member 114 is a push button operatively attached by a third locking member 116 to the first locking member 112. In another embodiment, the second locking member 114 is a pull cable operatively attached to the first locking member 112.

With continuing reference to FIGS. 3-12, the headrest assembly 30 may include a biasing member (not shown) for use in biasing the locking mechanism in the locked condition. The biasing member may be operatively connected to either the first locking member 112 or to the second locking member 114. In one embodiment, the biasing member is a spring that is operatively connected to the first locking member 112 and the first frame member 90 to bias the first locking member 112 into the locked condition. In another embodiment, the biasing member is a spring that is operatively connected to the second locking member 114 and the second frame member 100 to bias the first locking member 112 into the locked condition. Exerting a force on the second locking member 114 overcomes the biasing force and allows the first locking member 112 to move from a locked condition to an adjustable condition.

With continuing reference to FIGS. 3-12, the first locking member 112 may move from a first locked condition, as shown in FIGS. 3, 6, 8, and 11, into to a second adjustable condition, as shown in FIGS. 4, 5, 7, 9, 10, and 12. In the first locked condition, the second portion 120 of the first locking member 112 is positioned within the second portion 154 of the slot 150. The first locked condition prevents the second frame member 100 from moving relative to the first frame member 90. To change from the first locked condition to the second adjustable condition, the second locking member 114 is engaged by an operator to cause the first locking member 112 to move along its axis. This causes the first portion 118 to a line with the slot 150. In this position, the first locking member 112 can be moved within the slot 150. More specifically, the first portion 118 of the first locking member 112 may now be positioned within the second portion 152 of the slot 150 as well as within the first portion 152 of the slot 150. This second adjustable condition permits the second frame member 100 to be moved relative to the first frame member 90 through at least eighty degrees of rotation and into the downward or "out-of-the-way" position.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A headrest assembly comprising:
   a first frame member operatively connectable to an associated seat, wherein the first frame member comprises a slot having a first portion with a first width and a second portion with a second width that is substantially larger than the first width;
   a second frame member that is selectively movable with respect to the first frame member; and,
   a locking mechanism comprising:
      a first locking member having a first portion with a first width and a second portion with a second width that is substantially larger than the first width;
      wherein the first width of the first portion of the first locking member is less than or equal to the first width of the first portion of the slot and the second width of the second portion of the first locking member is greater than the first width of the first portion of the slot; and,
      a second locking member operatively attached to the first locking member for use in adjusting the first locking member between a first locked condition, where the second portion of the first locking member is received within the second portion of the slot, that prevents the second frame member from moving relative to the first frame member, and a second adjustable condition, where the first portion of the first locking member is adapted to be positioned within the second portion of the slot to allow movement of the first portion of the locking member within the first portion of the slot, that permits the second frame member to move relative to the first frame member.

2. The headrest assembly of claim 1 further comprising:
a biasing member operably connected to the locking mechanism for biasing the locking mechanism in the locked condition.

3. The headrest assembly of claim 1 wherein:
the first locking member has a substantially cylindrical cross-section and the first width is defined by a first diameter and the second width is defined by a second diameter.

4. The headrest assembly of claim 1 wherein:
the second locking member is a release button.

5. The headrest assembly of claim 1 wherein:
the second locking member is a release cable.

6. The headrest assembly of claim 1 wherein:
the second frame member is selectively rotatable through at least eighty degrees with respect to the first frame portion and the width of the headrest assembly is 60 mm or less.

7. The headrest assembly of claim 1 wherein:
the second frame member is pivotally connected to the first frame member.

8. A vehicle comprising:
a vehicle frame;
an engine supported to the vehicle frame;
at least one ground engaging wheel supported to the frame and operatively connected to the engine to provide locomotion to the vehicle;
a vehicle body supported to the frame and defining a passenger compartment;
a vehicle seat supported to the passenger compartment; and
a headrest assembly supported to the vehicle seat, the headrest assembly comprising:
a first frame member operatively connectable to an associated seat, wherein the first frame member comprises a slot having a first portion with a first width and a second portion with a second width that is substantially larger than the first width;
a second frame member that is selectively movable with respect to the first frame member; and,
locking mechanism comprising:
a first locking member having a first portion with a first width and a second portion with a second width that is substantially larger than the first width;
wherein the first width of the first portion of the first locking member is less than or equal to the first width of the first portion of the slot and the second width of the second portion of the first locking member is greater than the first width of the first portion of the slot; and,
a second locking member operatively attached to the first locking member for use in adjusting the first locking member between a first locked condition, where the second portion of the first locking member is received within the second portion of the slot, that prevents the second frame member from moving relative to the first frame member, and a second adjustable condition, where the first portion of the first locking member is adapted to be positioned within the second portion of the slot to allow movement of the first portion of the locking member within the first portion of the slot, that permits the second frame member to move relative to the first frame member.

9. The vehicle of claim 8 wherein the headrest assembly further comprises:
a biasing member operably connected to the locking mechanism for biasing the locking mechanism in the locked condition.

10. The vehicle of claim 8 wherein:
the first locking member has a substantially cylindrical cross-section and the first width is defined by a first diameter and the second width is defined by a second diameter.

11. The vehicle of claim 8 wherein:
the second locking member is a release button.

12. The vehicle of claim 8 wherein:
the second locking member is a release cable.

13. The vehicle of claim 8 wherein:
the second frame member is selectively rotatable through at least eighty degrees with respect to the first frame portion and the width of the headrest assembly is 60 mm or less.

14. The vehicle of claim 8 wherein:
the second frame member is pivotally connected to the first frame member.

15. A method comprising the steps of:
A) providing a seat;
B) providing a headrest assembly comprising:
a first frame comprising a slot having a first portion with a first width and a second portion with a second width that is substantially larger than the first width;
a second frame member that is selectively movable with respect to the first frame member; and,
a locking mechanism comprising:
a first locking member having a first portion with a first width and a second portion with a second width that is substantially larger than the first width;
wherein the first width of the first portion of the first locking member is less than or equal to the first width of the first portion of the slot and the second width of the second portion of the first locking member is greater than the first width of the first portion of the slot; and,
a second locking member operatively attached to the first locking member; and,
C) placing the headrest assembly into a locked condition that prevents the second frame member from moving relative to the first frame member by positioning the second portion of the first locking member within the second portion of the slot;
D) adjusting the headrest assembly into a adjustable condition that permits the second frame member to move relative to the first frame member by positioning the first portion of the first locking member within the second portion of the slot; and,
E) adjusting the headrest assembly by pivoting the first frame member with respect to the second frame member as the first portion of the first locking member moves from the second portion of the slot into the first portion of the slot.

16. The method of claim 15 wherein step (B) comprises the step of:

providing a biasing member that operably connects to the locking mechanism for biasing the locking mechanism into the locked condition.

17. The method of claim 15 wherein step (B) comprises the step of:

providing the first locking member to be substantially cylindrical.

18. The method of claim 15 wherein step (E) comprises the step of:

pivoting the first frame member with respect to the second frame member through at least 80 degrees.

19. The method of claim 15 wherein step (D) comprises the step of:

moving the first locking member along its axis.

20. The method of claim 15 wherein step (D) comprises the step of:

manually engaging the second locking member.

\* \* \* \* \*